United States Patent [19]

Portas

[11] Patent Number: 5,560,969
[45] Date of Patent: Oct. 1, 1996

[54] TUBULAR SUPPORTING ELEMENT FOR A SLEEVE FOR COVERING JUNCTIONS, PARTICULARLY OF CABLES FOR TRANSMITTING ELECTRICAL ENERGY

[75] Inventor: Francesco Portas, Quattordio, Italy

[73] Assignee: Pirelli Cavi S.p.A., Milan, Italy

[21] Appl. No.: 351,878

[22] Filed: Dec. 8, 1994

Related U.S. Application Data

[63] Continuation of Ser. No. 985,182, Dec. 2, 1992, abandoned.

[30] Foreign Application Priority Data

Dec. 16, 1991 [IT] Italy ................... MI91A3362

[51] Int. Cl.$^6$ ................................. F16L 11/00
[52] U.S. Cl. ................... 428/36.9; 428/34.9; 428/43; 428/134; 428/136; 428/176; 174/135; 174/84 R; 29/235; 29/450; 138/120; 138/122; 138/154; 138/155; 285/18; 285/381.1
[58] Field of Search ................... 428/349, 369, 428/43, 134, 136, 176; 174/135, 84 R; 29/235, 450; 138/120, 122, 154, 155; 285/18, 381

[56] References Cited

U.S. PATENT DOCUMENTS

| | | | |
|---|---|---|---|
| 3,515,798 | 6/1970 | Sievert | 428/34.9 |
| 4,179,320 | 12/1979 | Midgley et al. | 156/86 |
| 4,389,440 | 6/1983 | Keith . | |
| 4,503,105 | 3/1985 | Tomioka . | |
| 5,087,492 | 2/1992 | Vallauri et al. | 428/34.9 |

FOREIGN PATENT DOCUMENTS

| | | | |
|---|---|---|---|
| 0117092 | 2/1984 | European Pat. Off. | H02G 15/18 |
| 0291203 | 4/1988 | European Pat. Off. | H02G 15/18 |
| 0399263A | 3/1990 | European Pat. Off. | H02G 15/18 |
| 1292608 | 11/1972 | United Kingdom | B25B 27/10 |

*Primary Examiner*—Marion E. McCamish
*Assistant Examiner*—Kathleen L. Choi
*Attorney, Agent, or Firm*—Brooks Haidt Haffner and DeLahunty

[57] ABSTRACT

A tubular supporting element for supporting an elastic sleeve for covering a junction of cables which is provided with a wall which has a groove or incision directed according to a helical line and which has a radial depth from the outer surface of the supporting element less than the radial thickness of the supporting element. The incision has a mouth at the outer surface of the supporting element with a width of less than 0.1 mm, preferably less than 0.05 mm, so as to provide a strip between the incision having a substantially rectangular cross-section. Also, a process and an apparatus for making the tubular supporting element.

22 Claims, 6 Drawing Sheets

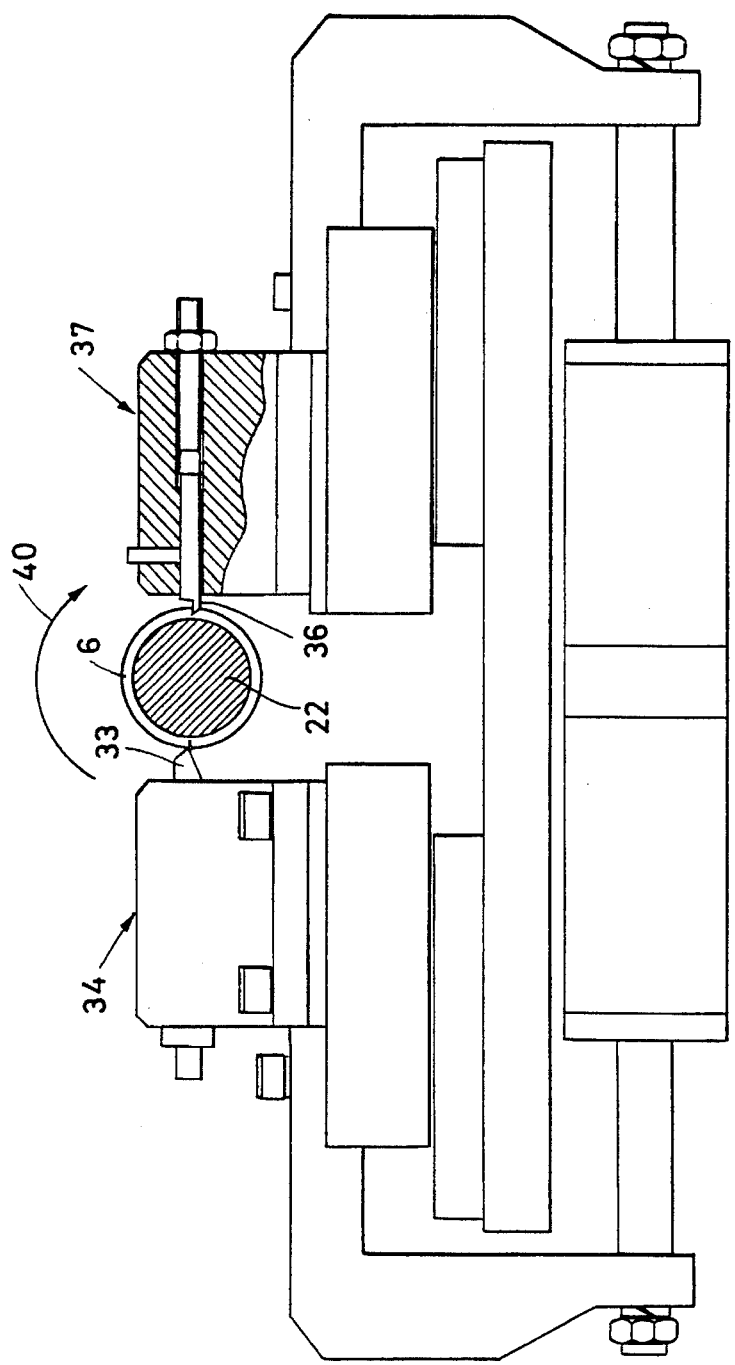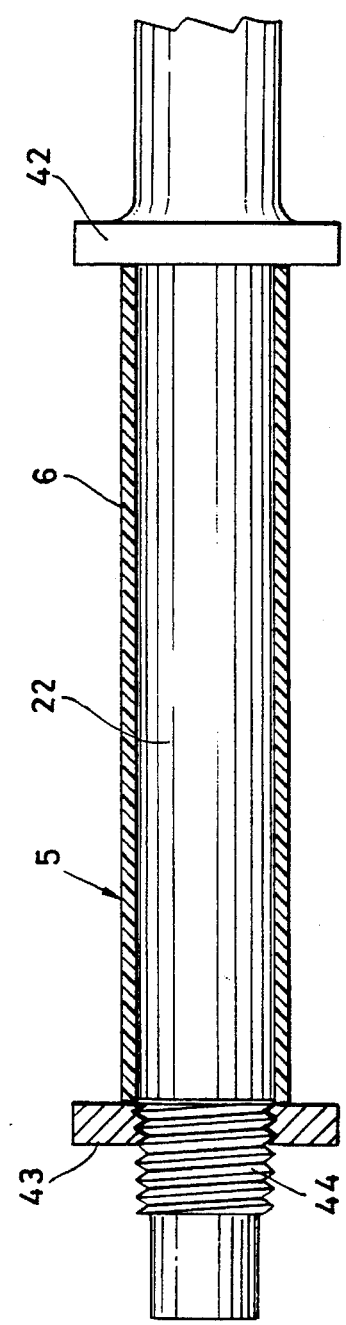

TUBULAR SUPPORTING ELEMENT FOR A SLEEVE FOR COVERING JUNCTIONS, PARTICULARLY OF CABLES FOR TRANSMITTING ELECTRICAL ENERGY

This application is a continuation, of application Ser. No. 07/985,182 filed Dec. 2, 1992, now abandoned.

The present invention related to a tubular supporting element for a sleeve for covering junctions, particularly for cables for transmitting electrical energy, and process and apparatus for the accomplishment of the abovementioned tubular supporting element.

BACKGROUND OF THE INVENTION

In order to execute the junction of cables for the transmission of electrical energy at medium and high voltages (higher than 10 KV), the extremities to be joined are deprived of the protection and insulation sheaths, so as to expose the electrical conductors and to make it possible to join them by means of welding or by means of clamping terminals. The junction area is then coated with suitable materials, such as putties, self-amalgamating tapes and such like, and over the extremities of the cables there is fitted a cover sleeve in elastomeric material, which has the functions of protecting and insulating the junction.

Covering sleeves are also applied to tubes, bars and such like, to obtain local protection against corrosion or for other purposes.

In order to fit a covering sleeve over a junction of electrical cables, it has been proposed to arrange the sleeves over a tubular element of rigid plastic materials, capable of keeping it under conditions of elastic expansion.

The tubular element is fitted over the extremity of one cable before the junction is executed and, once the connection between the conductors has been made, it is removed by slipping it out of the sleeve, which in this way, the sleeve can contract elastically and tighten itself over the cables at the junction.

Different forms of embodiments have been proposed to facilitate the operation of extracting the tubular supporting element.

In the British patent No. 1.292.608 there is described a hollow nucleus for supporting an elastic sleeve, formed by a pipe of plastic material having a deep helical groove on its external surface. There is thus defined a strip wound like a helix with the adjacent turns interconnected by a thin cordon which forms a preferential line of breakage and allows the separation of the turns by pulling one extremity of the strip. In this way, the pipe is removed in the form of a continuous thin strip, allowing the sleeve to contract over the cables.

The U.S. Pat. No. 4,389,440 describes a hollow nucleus for supporting an elastic sleeve, formed by a tape in plastic material wound in a spiral, having thinned-out edges, constrained at certain points so as to form a substantially rigid pipe, that can collapse and be removed to allow the abovementioned sleeve to be fitted.

The U.S. Pat. No. 4,503,105 relates to a tubular nucleus formed by a plastic pipe whose wall is provided with internal ribs, axially directed and spaced in a circumferential direction, and is externally cut along a helical line, so as to form a continuous helically-wound strip, held together by the axial ribs.

The European patent application No. 0,291,203 describes a helical support obtained from a tubular casing having notches extending through the wall thereof and arranged along the helical line and spaced in a circumferential direction and staggered, so as to leave in between the notches themselves connection areas of resistance such as to allow the helical support to be undone manually, by pulling on an extremity. The incisions are made by means of a tool constituted by a toothed cutting wheel.

When the helical support is obtained from a tubular casing with a helical incision, accomplished with tools operating by the removal of chips, the width of the incisions themselves is at least equal to the thickness of the tool.

With tubular supporting elements of the type described in the abovementioned patents, provided with external helical incisions, deformations of the internal wall of the sleeve made of elastomeric material are inevitable, and this can lead to supporting drawbacks.

In fact, the fitting of the sleeve over the tubular supporting element is executed during the manufacturing stage, and thus the sleeve and the tubular supporting element remain engaged for a long period of time before the tubular supporting element is removed to execute the fitting of the sleeve over a junction of electrical cables.

It thus occurs that the sleeve, mounted onto the tubular supporting element under conditions of high elastic expansion, exerts on this a strong centripetal compression, which, in the presence of discontinuities, such as incisions of notches, in the wall of the tubular element itself, leads the sleeve material to extend inside the incisions or inside the notches, with consequent deformations of its internal wall.

It so happens that these deformations are not completely eliminated in the short time span between the removal of the tubular supporting element and the contraction of the sleeve round the electrical cables of a junction. In fact, the materials that are suitable for accomplishing elastic sleeves for junctions of electrical cables, after remaining in conditions of elastic deformation for a certain period of time, exhibit a certain value of residual deformation which, at room temperature, can only be recovered after a few hours or days.

Thus, between the internal wall of the sleeve, which remains deformed, and the external surface of the insulation of the cables, inclusions of air are formed, with highly detrimental consequences, since, when air ionises in the presence of the strong electrical fields existing in the junction during use, can produce partial discharges, of an intensity equal to several tens or hundreds of picoCoulombs, which jeopardise the functionality of the sleeve and of the junction as a whole.

In the Italian patent application No. MI 91 A 001416, filed on 23 May 1991 in the name of the same Applicant, there is described a tubular supporting element of a sleeve made of elastomeric material, having a smooth and continuous external wall and provided with a helical groove, with a substantially triangular or trapeze-shaped cross-section, obtained on its internal wall.

This solution, which allows the external surface of the tubular support to be smooth, reduces the resistant cross-section of the tubular casing itself, with respect to the condition of the integral pipe, limiting the pressure that it can sustain for a given wall thickness.

BRIEF DESCRIPTION OF THE INVENTION

According to the present invention a tubular supporting element for a sleeve For covering junctions has been found, the supporting element being provided with a wall that has at least one non-passing incision, or incision which does not pass through the wall, directed according to a helical line suitable for defining a strip wound like a helix with adjacent turns interconnected by a thin cordon also wound like a helix, characterised in that said incision has a thickness of less than 0.1 mm, and preferably less than 0.05 mm, at the mouth of the tubular casing's surface.

According to another embodiment, the present invention relates to a process for accomplishing a tubular supporting element of a sleeve for covering junctions, provided with a wall that has at least one non-passing incision directed according to helical line, characterised in that it comprises the steps of constraining the abovementioned tubular element on a means of support under conditions of substantial axial containment and executes the abovementioned incision by a process involving the removal of chips.

According to a further embodiment, the present invention provides for an apparatus suitable for accomplishing a tubular supporting element of a sleeve for covering junctions, provided with a wall that has at least one non-passing incision directed according to helical line, comprising means for supporting the abovementioned tubular element and cutting means suitable for making the aforesaid incision by the removal of chips in the abovementioned wall, characterised in that said means of support sustain said tubular element under conditions of axial containment and said cutting means have a thickness that is substantially greater that said width of the incision, preferably not less than 0.5 mm.

With this solution it is possible to obtain a tubular supporting element of a covering sleeve that has the wall in contact with the abovementioned sleeve that is, in practice, smooth, even with a helical incision made on the same contact wall, and a resistant cross-section of each turn that is substantially rectangular capable of supporting comparatively high loads of centripetal compression, substantially similar to that of the integral tubular casing.

BRIEF DESCRIPTION OF THE DRAWINGS

Features and advantages of the invention shall now be illustrated with reference to preferred embodiments represented as non-limiting examples in the enclosed drawings, wherein:

FIG. 4 is an enlarged lateral view of a supporting chuck, of a tubular supporting element and of tools of the apparatus of FIG. 3;

FIG. 8 is a variant of the supporting chuck of FIGS. 5 and 6 and;

DETAILED DESCRIPTION OF PREFERRED EMBODIMENTS

Figure 1:
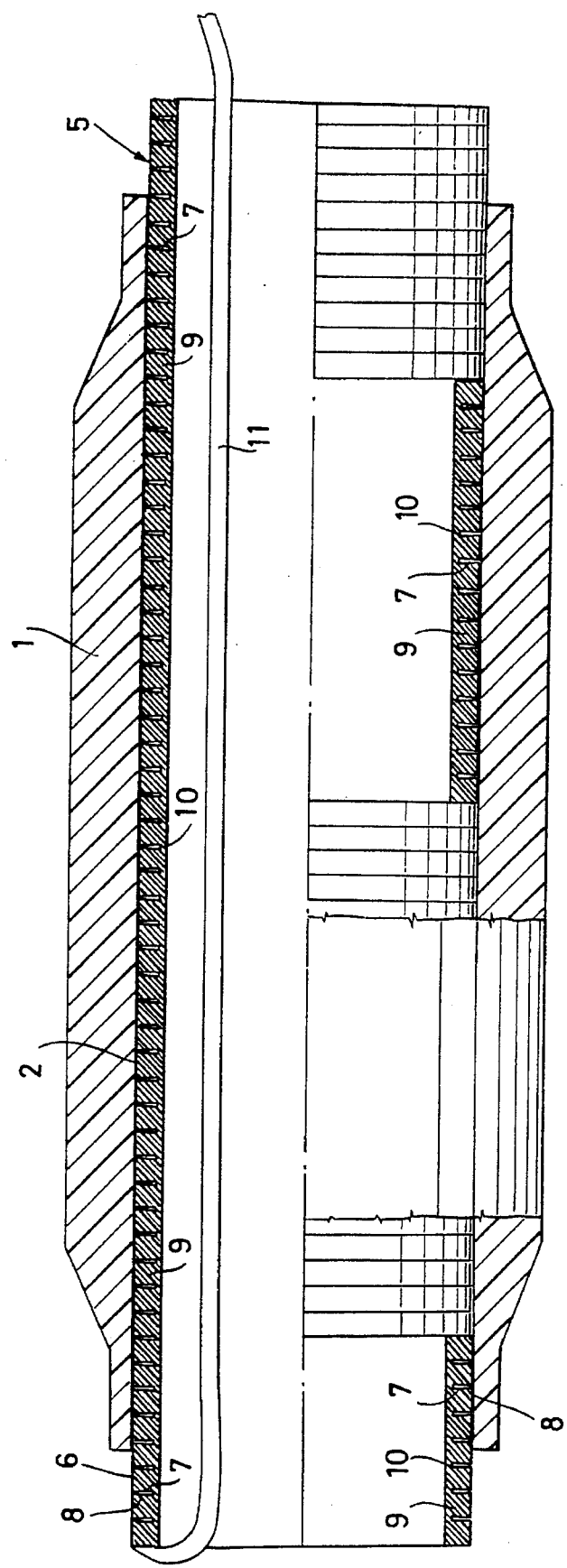
FIG. 1 is a view in partial axial cross-section of a sleeve for covering a junction between electrical cables and of a tubular supporting element accomplished according to the invention.
Figure 2:
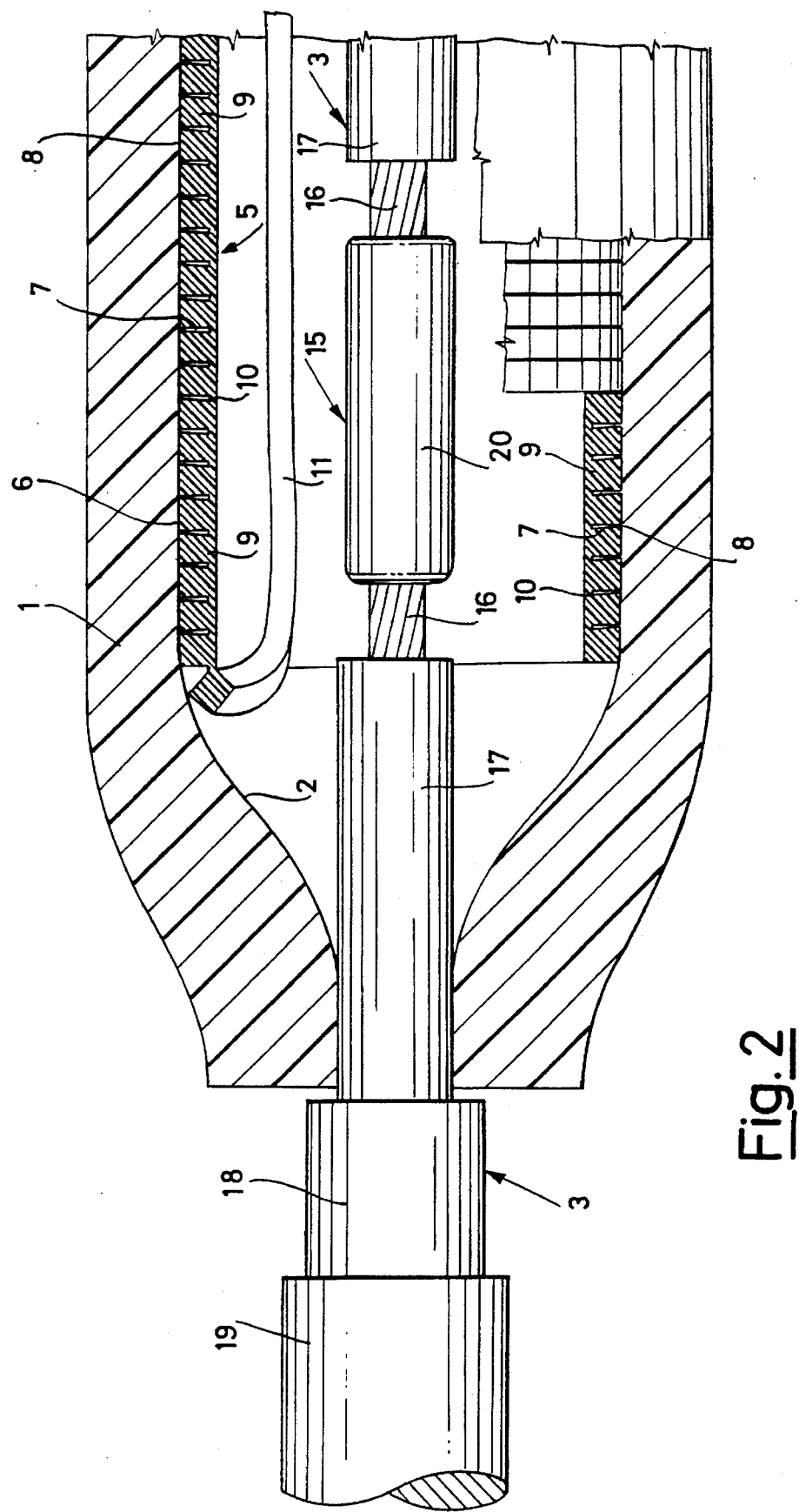
FIG. 2 is a partial view in axial cross-section of a junction between electrical cables using the covering sleeve and the tubular supporting element of FIG. 1, represented on an enlarged scale.

There is indicated in FIG. 1 with 1 a covering sleeve in elastomeric material having an internal wall 2; the sleeve 1 has functions of protection and insulation of a junction between two electrical cables, indicated as a whole with 3 in FIG. 2, for the transmission of electrical energy as medium or high voltages; there is indicated as a whole with reference numeral 5 a tubular supporting element over which the sleeve 1 is fitted under conditions of elastic expansion, of the order of 100 % for junctions of high-voltage cables and of the order of 200%–300% for junctions of medium-voltage cables.

Figure 7:
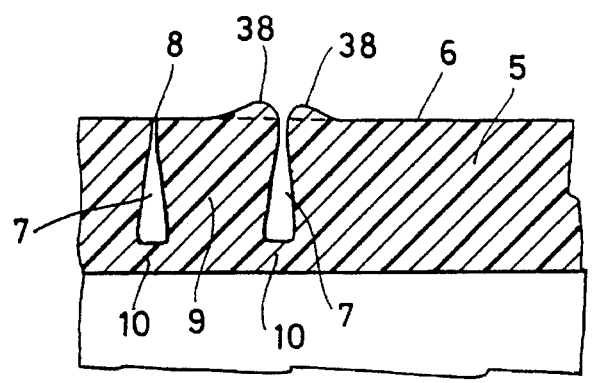
FIG. 7 is an enlarged view in partial cross-section of the tubular supporting element of FIGS. 5 and 6.

The tubular element 5 has an wall 6 provided with a non-passing incision directed along a helical line, which at its mouth 8 at the outer surface of the tubular element has a reduced width, less than 0.1 mm, and preferably less than 0.05 mm. As also shown in FIG. 7, such incision provides a strip 9 with a substantially rectangular cross-section, wound like a helix with adjacent turns interconnected by an internal cordon, or portion of the wall, 10 having a reduced thickness, that is also wound according to the abovementioned helical line, that constitutes a preferential line of breakage. There is indicated with reference numeral 11 an extension of the strip 9, which extends interiorly of tubular element 5 to at least the other end of or to the exterior outside the tubular element 5.

The tubular element 5 is made of plastic material such as PVC (polyvinylchloride), polyolefines, polyamides and such like.

Since the incision 7 has a mouth 8 with an extremely limited width, the external wall 6 of the tubular element 5 is in practice smooth and thus the wall 2 of the sleeve 1 undergoes no deformation even though it may remain engaged with the wall 6 for a long period of time before the same sleeve 1 is applied to a junction of electrical cables. The tubular element 5, being formed by the strip 9 with a substantially rectangular cross-section, has a resistant cross-section suitable for supporting the considerable centripetal compression exerted by the sleeve 1, that can be of the order of 1 MPa, that is, a resistant cross-section substantially equal to, or only slightly less than, the resistance of the integral tubular casing, that is, having no incision 7.

There is illustrated in FIG. 2 the assembly diagram of the sleeve 1, with the help of the tubular element 5, on a junction, indicated as a whole with reference numeral 15 between the electrical cables 3.

The cables 3 comprise respective conductors 16 covered with insulation 17, with capacitative shields 18 and with external protective sheaths 19. After the set consisting of the tubular supporting element 5 and of the sleeve 1 has been fitted over the cable 3, in the junction area the extremities of the cables 3 are deprived, one after the other, of their respective protection and insulation coverings, so as to lay bare the respective conductors 16 and to connect them together through a terminal 20, round the junction 15 there is added a suitable filling material, not shown, such as putty in the paste state or self-amalgamating tapes and the junction 15 is then covered with the sleeve 1.

When traction is exerted on the extension or pulling element 11, the first turn of the strip 9 becomes separated from the tubular element 5 and turns are in this way progressively detached due to the effect of the tearing of the cordon 10 having reduced thickness, so that the tubular element 5 itself, while it is being undone, is removed and the sleeve 1 progressively contracts over the cables 3 so as to restore conditions suitable for the proper operation of the cables.

The contraction of the sleeve 1 exerts an auxiliary force on the turn being pulled through the extension 11 and facilitates the collapse of the tubular element 5.

Figure 3:
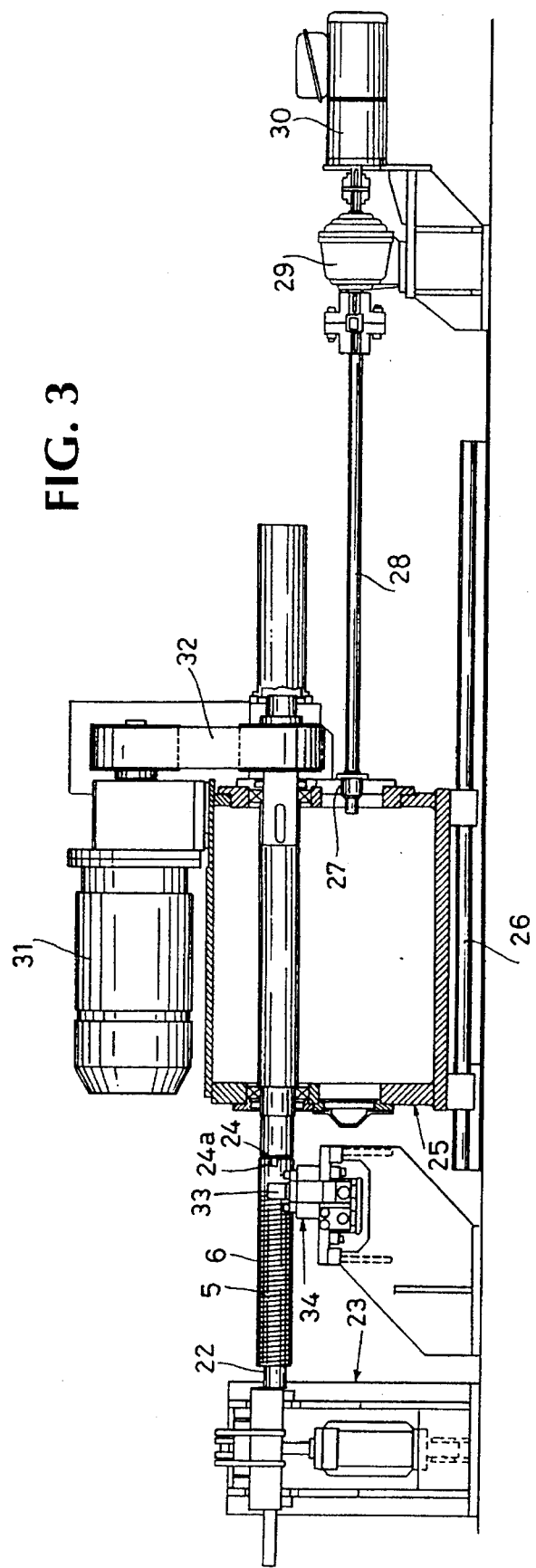
FIG. 3 is a side view, in partial cross-section, of an apparatus for the accomplishment of the tubular supporting element of FIG. 1.
Figure 6:
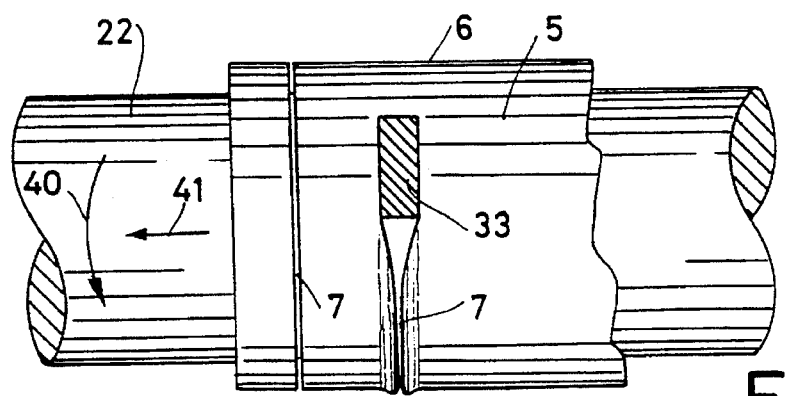
FIG. 6 is a side view, in partial cross-section, of the supporting chuck, of a tubular supporting element and of a tool of FIG. 5.

There is indicated in FIG. 3 supporting chuck 22 that is rotatable and axially displaceable, as indicated by the arrows 40 and 41 of FIGS. 4 and 6, over which it is fitted under conditions of radial interference, against a shoulder 24, which conveniently has a tooth 24a suitable for transmitting the rotation to a tubular element 5 being processed. The chuck 22 is rotatably supported in a fixed supporting structure, indicated as a whole with reference numeral 23 and in a slidable supporting structure, indicated as a whole with reference numeral 25, mounted on guides 26 and operated, by means of a transmission comprising a screw having helical teeth and balls 27, a worm gear with balls 28 and a gear reduction unit 29, and an electric motor 30. The chuck 22 is operated in rotation by an electric motor 31, through a transmission 32.

Figure 5:
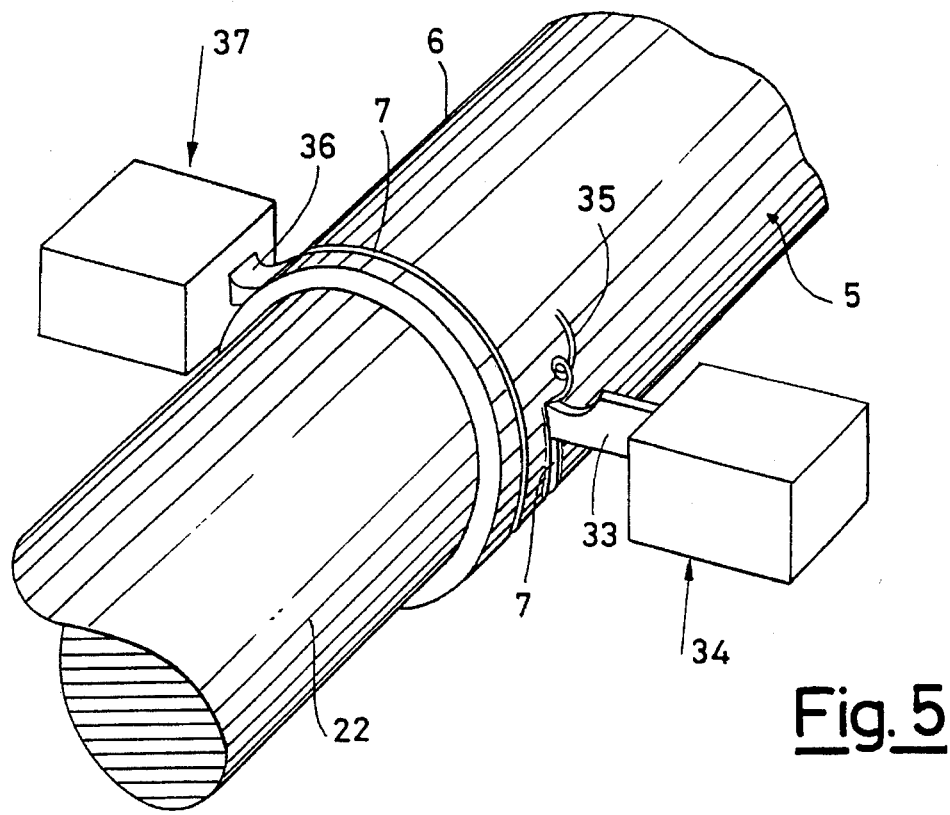
FIG. 5 is a partial perspective view of a supporting chuck, of a tubular supporting element and of tools of the apparatus of FIG. 3.

There is indicated with reference numeral 33 a mechanical processing tool for the removal of chips, also visible in FIGS. 4, 5, 6, held in a supporting structure 34, provided with a cutting blade having a thickness ranging from 0.8 to 1 mm, suitable for making in the external wall 6 of the tubular element 5 the helical incision 7 by means of the removal of chips 35, as shown in FIG. 5.

There is indicated with reference numeral 36 a shaving tool, also shown in FIGS. 4 and 5, held in a supporting structure 37, that is used to remove from the wall 6 the crests of material, indicated with 38 in FIG. 7, that are formed at the sides of the mouth 8 of the incision 7, during the processing by the tool 33, the incision 7 having a reverse V-shaped cross-section.

In order to proceed with the incision of the tubular element 5 with the incision width indicated above, the elements is fitted over the chuck 22 under conditions of radial interference, such as to substantially prevent the longitudinal (or axial) expansion of the tubular element 5 while the abovementioned incision 7 is made. The interference, for example, ranges from 0.2% to 0.5% of the internal diameter of the tubular element itself with materials having a coefficient of elasticity E=800 to 1000 MPa, so that, due to the friction between the tubular element and the chuck that supports it, there is accomplished an axial containment of the tubular element itself.

The helical incision 7 is made by the tool 33, while the chuck 22 is operated by the motors 30 and 31 in rotation and translation, operating at room temperature, so that the material heated by friction flows outwards and goes to partly fill the incision 7 in the proximity of the mouth 8. The crests 38 that are formed are then removed by the shaver 36.

It has been noted that with the apparatus and the method described it is possible to obtain a tubular element 5 formed by a strip 9 having, with a substantially rectangular, or square, resistant cross-section, that is especially strong, wherein the incision 7 has a width at the surface of the tubular element that is less than 0.1 mm, possibly even less than 0.05 mm, in relation to the magnitude of the containment accomplished.

After the removal, if any, of the crests 38, by means of the shaving tool 36, the external surface of the tubular element 5 is in practice smooth and causes no deformation of the internal surface 2 of the sleeve 1.

With the apparatus and process indicated above it is possible to accomplish tubular supports suitable for holding elastic sleeves of the type described using commercial extruded pipes, without requiring for them particular qualitative prescriptions, such as, for example, polypropylene pipes according to DIN 8077 specifications.

In Fact, on the basis of such specifications, extruded pipes can have a wall thickness tolerance up to 0.1 s+0.2 mm, where s is the nominal thickness of the wall, due, for example, to the ovalisation of the pipe or to the eccentricity of the external and internal surfaces.

Under such conditions, operating according to the invention it is in any case possible to ensure a constancy of the thickness in the connecting area 10 between the turns, since the forced assembly of the tubular element 5 being processed on the chuck 22 forces its internal surface to match perfectly the surface of the chuck itself, which being made preferably of metal, can be manufactured with the necessary dimensional accuracy.

The tool 33 can then be arranged in an accurate position with respect to the chuck surface and thus the thickness of the area 10 is kept constant with a high degree of accuracy, without the possible eccentricity or ovalisation of the starting pipe having an appreciable influence.

On the basis of what has been described above, a tubular support for elastic sleeves has been accomplished starting from a commercial pipe made of polypropylene, having internal diameter of 45 mm and external diameter of 51 mm. The support had a useful length, after eliminating the initial and final processing extremities, of some 50 cm.

The starting pipe, about 60 cm long, has been forcibly introduced on a chuck 22 having a diameter of 45.2 mm.

The processing tool had a thickness of 0.8 mm and during processing, it penetrated into the thickness of the wall of the pipe leaving a residual thickness of 0.5 mm.

Under these conditions, a tubular support has been obtained wherein the width of the helical incision, at the external surface, has been measured to range from 0.05 mm to zero, meaning by this that in some areas the sides of the incision were locked together, making it impossible to introduce a feeler gauge into the incision itself.

With the same tool, but operating in the absence of force on the tubular element, which has been processed by keeping it supported on a chuck having a diameter of 45.0 mm, a length of incision has been obtained that is substantially equal to the thickness of the tool used.

It is believed that the result obtained is due to the fact that, in the presence of a forced assembly of the pipe on the chuck, a force is generated by friction between the chuck and the pipe that opposes a longitudinal extension of the pipe itself during processing, that is, the pipe is in a state of containment of its axial extension.

This means that, since an axial extension is inhibited, in order to leave space for the tool that penetrates into the thickness of the wall of the pipe to accomplish the incision, the material is elastically compressed round the tool, returning elastically to the previous dimension after the passage of the tool, so that the material removed by the tool while executing the incision, is in fact less than would correspond to a groove equal to the actual thickness of the tool.

As an alternative, it is possible to accomplish the invention with an apparatus of the type illustrated earlier, but making use of a chuck, as indicated in FIG. 8.

On such a chuck the tubular element 5 is fitted without any interference (but preferably in the substantial absence of radial clearance), and is moved in abutment against a fixed shoulder 42 similar to the shoulder 24 described earlier.

On the opposite side, the tubular element is axially constrained by a mobile shoulder 43, moved in abutment and held tightly against the tubular element 5 through screw means 44 or similar members.

In such an embodiment, as in the previous case, any extension of the tubular element 5 is substantially inhibited during processing with the tool 33, so as to determine an incision having minimum or zero width.

Figure 9:
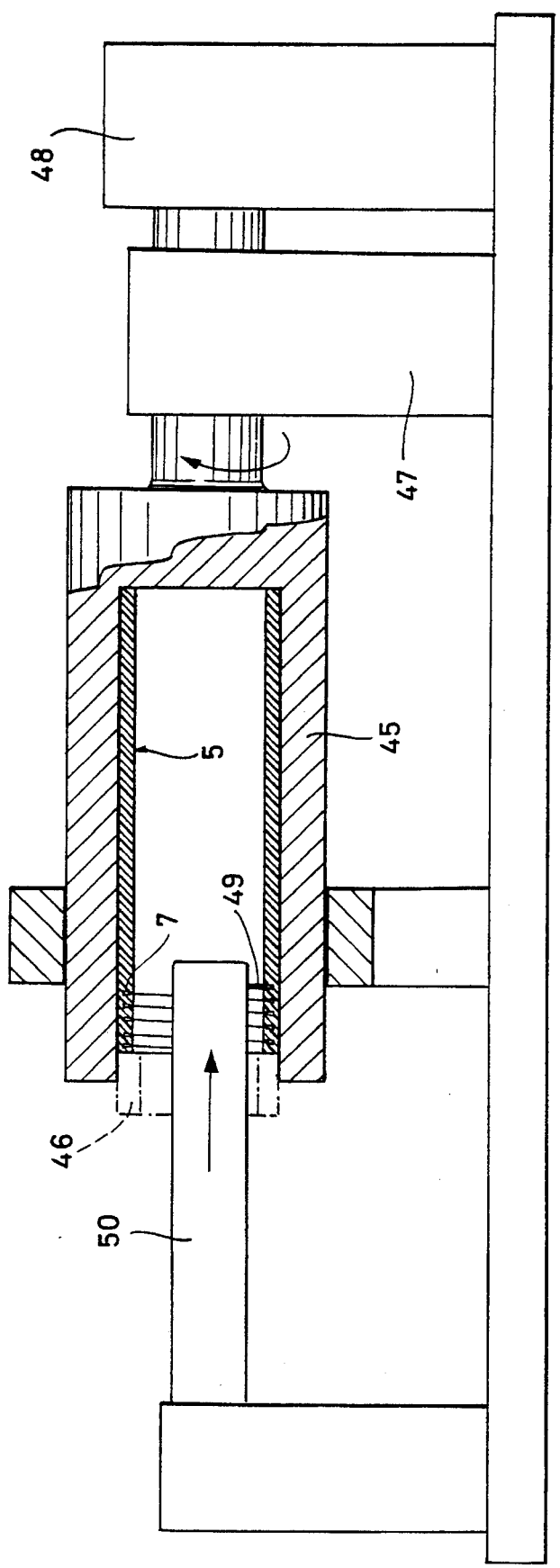
FIG. 9 is a diagrammatic view of another embodiment of the invention.

According to a further alternative, illustrated in a highly diagrammatic form in FIG. 9, it is possible to accomplish a tubular support with an internal incision, while still, on the other hand, maintaining a width of the incision less than the thickness of the tool, so as to reduce to a minimum the weakening of the tubular element due to the incision.

This can be particularly useful in the case where requirements of smoothness of the surface of the tubular element in contact with the sleeve are particularly severe, for example, in uses in the field of high voltages.

To this end the tubular element 5 can be held inside a supporting member 45, under conditions of axial containment, by friction, that is, by insertion with radial interference, or with a locking shoulder 46, indicated in the figure with dotted lines.

The supporting member 45, rotatably supported by a base 47, is rotated by a motor unit 48.

A tool 49, supported by a tool holder 50, makes the incision of the tubular element, with a relative axial movement with respect to the supporting member 45.

While, under such conditions, further processing of the internal surface of the tubular element is not necessary, a subsequent processing of the external surface of the tubular element may be appropriate, after it has been removed from the supporting member 45, for example, by means of a tool similar to the shaving tool 36 described earlier, so as to obtain the required characteristics of surface smoothness.

I claim:

1. A tubular supporting element for supporting an elastic sleeve for covering junctions of cables, said sleeve having an inner surface defining the bore of said sleeve, said supporting element being receivable within said bore of said sleeve and having sufficient radial resistance and an outer surface of a diameter to maintain said sleeve in a radially stretched state when said supporting element is within said sleeve, said tubular supporting element comprising:

a tubular body with a wall of a predetermined radial thickness and with an outer surface and an inner surface coaxial with the axis of said body, said outer surface being engageable with said inner surface of said sleeve, said wall having at least one incision therein which helically encircles said axis and which is continuous circumferentially of said axis, said incision separating portions of said wall from each other so as to define a strip between one turn of the incision and the next turn of the incision which strip thereby extends helically around said axis;

said incision extending radially of said axis either from said outer surface of said tubular body toward said inner surface of said tubular body or from said inner surface of said tubular body toward said outer surface of said tubular body but having a radial dimension less than said predetermined thickness so that a rupturable radial portion of said wall remains between said incision and one of said outer or inner surface to interconnect helical turns of said strip; and said incision having a reverse V-shaped cross-section having a mouth at said outer or inner surface and a width at said radial portion, said mouth having a width transverse to the helical length of said incision which is not greater than said width at said radial portion and which is less than about 0.1 mm, whereby penetration of said sleeve into said incision is substantially prevented when said sleeve is on said body.

2. A tubular supporting element as set forth in claim 1 wherein said width of said mouth is less than 0.05 mm.

3. A tubular supporting element as set forth in claim 1 wherein said strip is substantially rectangular in cross-section.

4. A tubular supporting element as set forth in claim 1 wherein said incision extends from said outer surface.

5. A tubular supporting element as set forth in claim 1 wherein said incision extends from said inner surface.

6. A tubular supporting element as set forth in claim 1 wherein a pulling element is attached to an end of said strip at one end of said supporting element and extends interiorly of said supporting element to at least the other end of said supporting element.

7. A tubular supporting element as set forth in claim 6 wherein said pulling element further extends to the exterior of the other end of said supporting element.

8. A tubular supporting element for supporting an elastic sleeve for covering junctions of cables, said sleeve having an inner surface defining the bore of said sleeve, said supporting element being receivable within said bore of said sleeve and having sufficient radial resistance and an outer surface of a diameter to maintain said sleeve in a radially stretched state when said supporting element is within said sleeve, said tubular supporting element comprising:

a tubular body with a wall of a predetermined radial thickness and with an outer surface and an inner surface coaxial with the axis of said body, said outer surface being engageable with said inner surface of said sleeve, said wall having at least one incision therein which helically encircles said axis and which is continuous circumferentially of said axis, said incision separating portions of said wall from each other so as to define a strip between one turn of the incision and the next turn of the incision which strip thereby extends helically around said axis;

said incision extending radially of said axis either from said outer surface of said tubular body toward said inner surface of said tubular body or from said inner surface of said tubular body toward said outer surface of said tubular body but having a radial dimension less than said predetermined thickness so that a rupturable radial portion of said wall remains between said incision and one of said outer or inner surfaces to interconnect helical turns of said strip; and said incision having a reverse V-shaped cross-section having a mouth at said outer or inner surface and said incision having a width at said radial portion which is greater than a width of said incision at said mouth and the width of said mouth is less than about 0.1 mm, whereby penetration of said sleeve into said incision is substantially prevented when said sleeve is on said body.

9. An assembly of a tubular supporting element with a radially stretched elastic sleeve for covering junctions of cables, said sleeve having an inner surface defining the bore of said sleeve, said supporting element being within said bore of said sleeve and having sufficient radial resistance and an outer surface of a diameter to maintain said sleeve in a radially stretched state, said tubular supporting element comprising:

a tubular body with a wall of a predetermined radial thickness and with an outer surface and an inner surface coaxial with the axis of said body, said outer surface engaging said inner surface of said sleeve, said wall having at least one incision therein which helically encircles said axis and which is continuous circumferentially of said axis, said incision separating portions of said wall from each other so as to define a strip between one turn of the incision and the next turn of the incision which strip thereby extends helically around said axis;

said incision extending radially of said axis either from said outer surface of said tubular body toward said inner surface of said tubular body or from said inner surface of said tubular body toward said outer surface of said tubular body but having a radial dimension less than said predetermined thickness so that a rupturable radial portion of said wall remains between said incision and one of said outer or inner surfaces to interconnect helical turns of said strip; and said incision having a reverse V-shaped cross-section having a mouth at said outer or inner surface and a width at said radial portion, said mouth having a width transverse to the helical length of said incision which is not greater than said width at said radial portion and which is less than about 0.1 mm, whereby penetration of said sleeve into said incision is substantially prevented.

10. An assembly as set forth in claim 9 wherein said width of said mouth is less than 0.05 mm.

11. An assembly as set forth in claim 9 wherein said strip is substantially rectangular in cross-section.

12. An assembly as set forth in claim 9 wherein in said incision extends from said outer surface.

13. An assembly as set forth in claim 9 wherein in said incision extends from said inner surface.

14. An assembly as set forth in claim 9 wherein a pulling element is attached to an end of said strip at one end of said supporting element and extends interiorly of said supporting element to at least the other end of said supporting element.

15. An assembly as set forth in claim 14 wherein said pulling element further extends to the exterior of the other end of said supporting element.

16. An assembly of a tubular supporting element with a radially stretched elastic sleeve for covering junctions of cables, said sleeve having an inner surface defining the bore of said sleeve, said supporting element being within said bore of said sleeve and having sufficient radial resistance and an outer surface of a diameter to maintain said sleeve in a radially stretched state, said tubular supporting element comprising:

a tubular body with a wall of a predetermined radial thickness and with an outer surface and an inner surface coaxial with the axis of said body, said outer surface engaging said inner surface of said sleeve, said wall having at least one incision therein which helically encircles said axis and which is continuous circumferentially of said axis, said incision separating portions of said wall from each other so as to define a strip between one turn of the incision and the next turn of the incision which strip thereby extends helically around said axis;

said incision extending radially of said axis either from said outer surface of said tubular body toward said inner surface of said tubular body or from said inner surface of said tubular body toward said outer surface of said tubular body but having a radial dimension less than said predetermined thickness so that a rupturable radial portion of said wall remains between said incision and one of said outer or inner surfaces to interconnect helical turns of said strip; and said incision having a reverse V-shaped cross-section having mouth at said outer or inner surface and said incision having a width at said radial portion which is greater than a width of said incision at said mouth and the width of said mouth is less than about 0.1 mm, whereby penetration of said sleeve into said incision is substantially prevented.

17. An assembly as set forth in claim 8 wherein said incision extends from said outer surface.

18. An assembly as set forth in claim 16 wherein said incision extends from said outer surface.

19. A tubular supporting element for supporting an elastic sleeve for covering junctions of cables, said sleeve having an inner surface defining the bore of said sleeve, said supporting element being receivable within said bore of said sleeve and having sufficient radial resistance and an outer surface of a diameter to maintain said sleeve in a radially stretched state when said supporting element is within said sleeve, said tubular supporting element comprising:

a tubular body with a wall of a predetermined radial thickness and with an outer surface and an inner surface coaxial with the axis of said body, said outer surface being engageable with said inner surface of said sleeve, said wall having at least one incision therein which helically encircles said axis and which is continuous circumferentially of said axis, said incision separating portions of said wall from each other so as to define a strip between one turn of the incision and the next turn of the incision which strip thereby extends helically around said axis;

said incision extending radially of said axis either from said outer surface of said tubular body toward said inner surface of said tubular body or from said inner surface of said tubular body toward said outer surface of said tubular body but having a radial dimension less than said predetermined thickness so that a rupturable radial portion of said wall remains between said incision and one of said outer or inner surface to interconnect helical turns of said strip; and said incision having a reverse V-shaped cross-section having a mouth at said outer or inner surface and said incision having a width at said radial portion which is greater than a width of said incision at said mouth and a width of said mouth of less than about 0.1 mm, whereby penetration of said sleeve into said incision is substantially prevented when said sleeve is on said body.

20. An assembly of a tubular supporting element with a radially stretched elastic sleeve for covering junctions of cables, said sleeve having an inner surface defining the bore of said sleeve, said supporting element being within said bore of said sleeve and having sufficient radial resistance and an outer surface of a diameter to maintain said sleeve in a radially stretched state, said tubular supporting element comprising:

a tubular body with a wall of a predetermined radial thickness and with an outer surface and an inner surface coaxial with the axis of said body, said outer surface engaging said inner surface of said sleeve, said wall having at least one incision therein which helically encircles said axis and which is continuous circumferentially of said axis, said incision separating portions of said wall from each other so as to define a strip between one turn of the incision and the next turn of the incision which strip thereby extends helically around said axis;

said incision extending radially of said axis either from said outer surface of said tubular body toward said inner surface of said tubular body or from said inner surface of said tubular body toward said outer surface of said tubular body but having a radial dimension less than said predetermined thickness so that a rupturable radial portion of said wall remains between said incision and one of said outer or inner surface to interconnect helical turns of said strip; and said incision having a reverse V-shaped cross-section having a mouth at said outer or inner surface and said incision having a width at said radial portion which is greater than a width of said incision at said mouth and a width of said mouth of less than about 0.1 mm, whereby penetration of said sleeve into said incision is substantially prevented.

21. A tubular supporting element for supporting an elastic sleeve for covering junctions of cables, said sleeve having an inner surface defining the bore of said sleeve, said supporting element being receivable within said bore of said sleeve and having sufficient radial resistance and an outer surface of a diameter to maintain said sleeve in a radially stretched state when said supporting element is within said sleeve, said tubular supporting element comprising:

a tubular body with a wall of a predetermined radial thickness and with an outer surface and an inner surface coaxial with the axis of said body, said outer surface being engageable with said inner surface of said sleeve, said wall having at least one incision therein which helically encircles said axis and which is continuous circumferentially of said axis, said incision separating portions of said wall from each other so as to define a strip between one turn of the incision and the next turn of the incision which strip thereby extends helically around said axis;

said incision extending radially of said axis either from said outer surface of said tubular body toward said inner surface of said tubular body or from said inner surface of said tubular body toward said outer surface of said tubular body but having a radial dimension less than said predetermined thickness so that a rupturable radial portion of said wall remains between said incision and one of said outer or inner surface to interconnect helical turns of said strip; and said incision having a reverse V-shaped cross-section having a mouth at said outer or inner surface and said incision having a width at said radial portion which is greater than a width of said incision at said mouth and a width of said mouth of less than about 0.1 mm, said incision being made by means of a cutting blade in condition of axial containment of said tubular supporting element, whereby penetration of said sleeve into said incision is substantially prevented when said sleeve is on said body.

22. An assembly of a tubular supporting element with a radially stretched elastic sleeve for covering junctions of cables, said sleeve having an inner surface defining the bore of said sleeve, said supporting element being within said bore of said sleeve and having sufficient radial resistance and an outer surface of a diameter to maintain said sleeve in a radially stretched state, said tubular supporting element comprising:

a tubular body with a wall of a predetermined radial thickness and with an outer surface and an inner surface coaxial with the axis of said body, said outer surface engaging said inner surface of said sleeve, said wall having at least one incision therein which helically encircles said axis and which is continuous circumferentially of said axis, said incision separating portions of said wall from each other so as to define a strip between one turn of the incision and the next turn of the incision which strip thereby extends helically around said axis;

said incision extending radially of said axis either from said outer surface of said tubular body toward said inner surface of said tubular body or from said inner surface of said tubular body toward said outer surface of said tubular body but having a radial dimension less than said predetermined thickness so that a rupturable radial portion of said wall remains between said incision and one of said outer or inner surface to interconnect helical turns of said strip; and said incision having a reverse V-shaped cross-section having a mouth at said outer or inner surface and said incision having a width at said radial portion which is greater than a width of said incision at said mouth and a width of said mouth of less than about 0.1 mm, said incision being made by means of a cutting blade in condition of axial containment of said tubular supporting element, whereby penetration of said sleeve into said incision is substantially prevented.

* * * * *

UNITED STATES PATENT AND TRADEMARK OFFICE
CERTIFICATE OF CORRECTION

PATENT NO. : 5,560,969
DATED : October 1, 1996
INVENTOR(S) : Portas

It is certified that error appears in the above-indentified patent and that said Letters Patent is hereby corrected as shown below:

Col. 1, line 31, change "sleeves" to --sleeve--;

Col. 2, line 15, change "supporting" to --serious--;

line 64, insert a comma (,) after "invention";

line 65, change "For" to --for--

Col. 4, line 10, cancel "with 1"; change "in" (second occurrence) to --1 of--;

line 11, after "2" change the semi-colon (;) to a period (.); change "the" to --The--;

line 14, change "as" to --at--;

line 22, after "incision" insert --7--;

line 64, change "round" to --around--;

Col. 5, line 43, change "elements" to --element 5--;

UNITED STATES PATENT AND TRADEMARK OFFICE
CERTIFICATE OF CORRECTION

PATENT NO. : 5,560,969
DATED : October 1, 1996
INVENTOR(S) : Portas

It is certified that error appears in the above-indentified patent and that said Letters Patent is hereby corrected as shown below:

Col. 6, line 11, change "Fact" to --fact--;

line 12, change "+" to --$\pm$--;

Col. 7, line 4, after "42" insert a comma (,);

Col. 8, line 2, change "surface" to --surfaces--;

Col. 10, line 9, after "having" insert --a--;

line 45, change "surface" to --surfaces--;

Col. 11, line 13, change "surface" to --surfaces--;

line 49, change "surface" to --surfaces--;

Col. 12, line 37, change "surface" to --surfaces--.

Signed and Sealed this

Twenty-fifth Day of February, 1997

Attest:

BRUCE LEHMAN

*Attesting Officer*  *Commissioner of Patents and Trademarks*